United States Patent

Strahl

[11] Patent Number: 5,891,888
[45] Date of Patent: Apr. 6, 1999

[54] PHYSICAL ENDURANCE DRINK

[76] Inventor: Robert Charles Strahl, 11170 Wood Elves Way, Columbia, Md. 21044

[21] Appl. No.: 7,095

[22] Filed: Jan. 14, 1998

[51] Int. Cl.$^6$ .................................................... A23L 1/304
[52] U.S. Cl. .............................. 514/305; 426/74; 426/89; 426/477; 426/590; 426/599; 426/648; 426/658; 426/810; 426/654
[58] Field of Search ................................ 426/74, 89, 477, 426/590, 599, 648, 654, 658, 810; 514/305

[56] References Cited

U.S. PATENT DOCUMENTS

| | | |
|---|---|---|
| 4,042,684 | 8/1977 | Kahm . |
| 4,853,237 | 8/1989 | Prinkkilä et al. . |
| 4,874,606 | 10/1989 | Boyle et al. . |
| 5,032,411 | 7/1991 | Stray-Gundersen . |
| 5,405,619 | 4/1995 | Santus et al. . |
| 5,417,982 | 5/1995 | Modi . |
| 5,430,021 | 7/1995 | Rudnic et al. . |

*Primary Examiner*—Helen Pratt
*Attorney, Agent, or Firm*—Leonard Bloom

[57] ABSTRACT

A composition to prevent dehydration, supply energy and prevent cramps contains electrolytes, carbohydrates and quinine and/or quinine salts and a method of preventing cramping caused by strenuous bodily activity. Palatability of the composition is improved by the effective use of carbohydrate, pH adjustment, flavoring and carbonation.

13 Claims, No Drawings

PHYSICAL ENDURANCE DRINK

FIELD OF THE INVENTION

The invention disclosed herein is directed to sports drinks which rehydrate the body and at the same time furnish supplemental electrolytes and nutrients.

BACKGROUND OF THE INVENTION

Engaging in strenuous exercise causes the body to become depleted of water and electrolytes, requiring replenishment. If water and electrolytes are not replaced, symptoms of dehydration can occur.

Physical activity, such as exercise, particularly in the heat, places a great metabolic demand on the body. During exercise, fluid in the form of sweat, lost from the body, can produce a state of dehydration. Associated with dehydration is an impairment of body heat dissipation and endurance. Although body electrolytes are also lost through perspiration, the net concentration of electrolytes per unit volume of body fluid actually increases. This is because perspiration causes a proportionately greater loss of water in comparison to the loss of body electrolytes. In addition, physical activity places an extra demand on the body's carbohydrate stores, such as muscle glycogen, liver glycogen and plasma glucose. Loss of water, redistribution and loss of electrolytes and the depletion of endogenous carbohydrate stores are the primary causes of fatigue which impairs one's ability to perform.

With stores of carbohydrates replenished during physical exertion, fatigue can be overcome. To maintain the body's physical capabilities, it is essential that water, electrolytes, carbohydrates, as well as other nutrients be provided in a timely and appropriate manner. Fluid replacement during physical activity has been shown to be an effective way of preventing dehydration and allowing for top physical performance. Of significance is the fact that the sports drink prevents dehydration. Dehydration itself can produce cramping.

Different theories abound as to the cause of muscular cramping during exercise. One theory postulates that cramping is due to electrolyte imbalance; another holds physical exercise causes damage to muscular tissue; and still another theory holds that muscle cramping is brought on by oxygen radicals produced by the body during strenuous exercise.

PRIOR ART PATENTS

Prinkkila in U.S. Pat. No. 4,853,237 teaches a fitness drink powder containing glucose polymer, various salts and fruit acid. The drink composition of Prinkkila is designed to be available to the body in an optimum manner. In addition, the drink product is designed to maintain a high sugar concentration in the blood during physical exertion.

In U.S. Pat. No. 5,032,411 Stray-Gunderson discloses a hypotonic beverage with essential electrolytes, minerals and carbohydrates. Because the beverage composition is hypotonic, the stomach empties very rapidly and the composition can produce a beneficial physiologic response.

Kahm in U.S. Pat. No. 4,042,684 discloses a dietetic beverage containing sugar and essential salts. The composition is said to enhance energy stores. In addition, the composition does not require preservatives. The mixture of glucose and fructose used in the composition produces rapid transport of glucose out of the digestive system while fructose is more slowly transported out of the system.

A flavored and sweetened aqueous dietetic beverage used to rehydrate the body is shown by Boyle in U.S. Pat. No. 4,874,606. L-aspartyl-L-phenyl-alanine methyl ester is included in the beverage to increase the degree of gastric emptying.

Santus et al in U.S. Pat. No. 5,405,619 teaches controlled release therapeutic systems for liquid pharmaceutical formulations. The patent discloses coated microgrannules which allow for suspension of the coated granules in the liquid vehicle.

In U.S. Pat. No. 5,417,982, Modi discloses polymer coated microspheres which are resistant to enzymatic degradation.

Rudaic in U.S. Pat. No. 5,430,021 teaches drugs incorporated into hydrophobic particles. Disclosed are various protective and sustained release coatings.

None of the prior art references teaches applicant's unique combination of ingredients to produce applicant's disclosed beneficial results.

OBJECTS OF THIS INVENTION

This invention has a main object to formulate a sports drink containing quinine, along with carbohydrates, electrolytes and fluids.

A further object is to prepare a sports drink containing quinine which is palatable. A significant object of this invention is to improve the palatability of quinine in the beverage.

Still another object is to prepare a sports drink containing quinine capable of preventing cramps brought about by physical exercise.

A major object of this invention is to produce a drink which enhances physical endurance.

A further object of this invention is to provide a beverage to supply quinine while still maintaining the palatability of the beverage.

DESCRIPTION OF THE INVENTION

The present invention relates to a beverage which provides the much needed liquid and salt replenishment needed by the dehydrated body. In particular, it is addressed to those individuals exerting themselves in medium to heavy levels of exercise.

In its broadest aspect the sports drink or beverage of this invention comprises in effective amounts of quinine or quinine hydrochloride dihydrate, as well as other quinine salts and derivatives, together with balanced amounts of carbohydrates and electrolytes. In addition, the drink can include ingredients to produce an acid pH. Additives to the sports drink can include fruit flavor, a preservative and carbonation.

The products within the scope of this invention may take a variety of forms. For instance, the product may be manufactured and sold as a single strength beverage for direct consumption by the consumer. Alternatively, the product may be in the form of an aqueous concentrate or syrup to be diluted with water to yield a beverage which fulfills the requirements of this invention. The product may also be in dry form, such as a powder or a tablet which is dissolved in water to yield the novel beverage composition of this invention.

The beverage product will be a lightly carbonated beverage supplementing the dietetic requirements of sugar and essential salts in the human body which have been depleted through vigorous physical activity. The drink of this invention will enhance the available energy stores and electrolytes within the body. The beverage will contain quinine which has been shown to be effective in preventing muscle cramps through a variety of physiologic mechanisms. Previously, athletes have had to get quinine from tonic water which, aside from sugar contained therein, is not a proper dietary supplement to replace fluids and salts lost due to vigorous physical activity.

The sugar of the present beverage is comprised of a combination of fructose and glucose to achieve an energy source capable of providing needed adequate physiological amounts of carbohydrates as their demand may vary. For example, glucose is easily and rapidly transported out of the digestive system into the blood whereas fructose is more passively and slowly transported. Thus, both immediate and longer lasting benefits are attainable through the use of this combination of carbohydrates. Also important is the amount of sugar in the formulation. An amount of sugar below a critical threshold has been found not to be able to mask the bitter taste of quinine. Rather than using purified fructose and glucose, high-fructose corn syrup could be used as a sugar replacement. The sports drink has an optimum balance of sugar to supply energy and palatability, but not so much sugar as to supply excessive calories. In the beverage of this invention, a range of 9 to 12% high fructose corn syrup would be operative with 10% being preferred.

The electrolytes of the beverage drink are provided in a specific relationship. The quantity and relative proportion of the salts are provided to achieve a palatable liquid without a salty taste. The salt components provide replacement for those essential ions lost in perspiration while, at the same time, yielding a highly palatable beverage in combination with the other electrolyte components, carbohydrates and flavoring agents of this invention.

The pH is important for providing palatability to the energy beverage. Lower pHs as opposed to higher pHs are effective for improving taste-masking of the quinine. A pH of about 2.5 has been tested and found to be a preferred palatability improver, but pHs somewhat above or below this target pH would be operative.

While a citrus fruit flavor such as lemon/lime for the sports beverage is most preferred as the flavoring agent any number of other flavors would be acceptable. The flavoring additive of the beverage composition and the concentrate of the present invention includes a flavor selected from fruit flavors or spice flavors. "Fruit flavor" denotes flavors derived from the natural edible parts of plants as well as synthetically prepared flavors made to simulate fruit flavors derived from natural sources. Preferred flavoring additives are citrus flavors, such as orange, lemon, lime, fruit punch and mixtures thereof. Other flavors, such as grape, cherry, apple and mixtures thereof, can also be used. Exotic flavors from fruits and other sources are envisioned. The amount of soluble flavor additive used depends upon the flavor or flavors selected, the flavor impression desired, and the form of flavor additive used. When a concentrated flavor is used as an additive, the amount of flavor additive can vary from about 0.05 to about 3.0% weight percent based on the total weight of the drinkable beverage composition. The preferred range is 0.5–1% with 1% being most preferred. Coffee and tea-like flavors could form the basis for flavors. Of course, a mixture of flavors could be useful. It is well to remember that a crucial ingredient of the sports drink of this invention is quinine. As is well known, quinine is bitter. Accordingly, the sports drink must be formulated with a view toward making the sports drink palatable. In the compositions tested by the invention, lemon-lime flavor is found to be a preferred flavor for the beverage. Other flavors could be found to be acceptable.

Quinine has a bitter taste and too large a dose of quinine would be unpalatable. On the other hand, there is a desire to produce a sports drink with an adequate dose of quinine and at the same time produce a drink that does have the desirable bitter tang of quinine. This desired state of adequate dose of quinine and also the desired bitter tang of quinine can be accomplished by coating a major portion of the quinine in micropellets and leaving a small amount of quinine uncoated so as to produce the desired bitter tang. Taking into account a typical dose of quinine as set forth above in the Physician's Desk reference a larger dose of quinine could be in the coated micropellet and a smaller amount of quinine would be uncoated to supply a bitter tang. A typical product would have 200 mg of quinine coated and 20 mg of quinine uncoated.

Desk Reference 47th edition (1993) states that Quinamm 260 mg (quinine sulfate tablets):

Clinical Pharmacology:
"Quinine, a chinchona alkaloid, acts on skeletal muscle by three mechanisms; it increases the refractory period by direct action on the muscle fiber, it decreases the excitability of the motor end-plate, an action similar to that of curare and it affects the distribution of calcium within the muscle fiber."

Dosage and Administration:
"1 tablet upon retiring. If needed, 2 tablets may be taken nightly—1 following the evening meal and 1 upon retiring. "

A proper dose is 260 to 520 mg per day (reference our Abstract page 6 line 17 & 18).

Capsules of 200 mg quinine sulfate and tablets of 260 mg quinine sulfate are commercially available. The optimum amount of quinine sulfate used in the beverages of this invention will be in the range of 20 mg per 8 ounces. In the beverage of this invention quinine per se or a non-toxic quinine salt may be employed e.g. quinine hydrochloride dihydrate.

Quinine is a bitter substance and efforts have been made in this invention to mask the taste of quinine. Specifically, the carbohydrates, flavors, carbonation and citric acid will have taste-masking effects on the quinine.

An embodiment of this invention proposes the use of glutamyl-glutamate as a palatability enhancer.

Another way of masking the taste of the quinine is to form the quinine into coated micropellets. The micropellets could be coated with a coating which dissolves in the stomach. Further, the coated micropellet could have a specific gravity the same as the liquid portion of the sports drink. In that way the settling out of the pellet in the liquid would be avoided. The coating on the micropellets could be a coating which is digested by the enzymes of the stomach. The specific gravity of the micropellets could be adjusted based on the overall specific gravity of the liquid beverage. By more or fewer interstices in the core of the micropellet and by the degree of compacting, the specific gravity can be adjusted. The coating of the micropellets or beadlets of quinine make the quinine drink more palatable. The specific gravity of the micropellets or beadlets is adjusted to conform to the specific gravity of the carbohydrate and electrolyte containing beverage. The specific gravity of the coated micropellets or beadlets can be adjusted by the amount of air trapped in the interstices of the carrier and quinine vehicle in the micropellets or beadlets. If the carrier and quinine are more highly compacted, the specific gravity can be increased, and if there is more air and the carrier with quinine are not highly compacted, the specific gravity can be decreased. Accordingly, a product substantially uniformly suspended in the liquid beverage is obtained.

To prepare the energy beverage of this invention having micropellets of quinine or quinine salt with the micropellets having the same specific gravity as the liquid phase of the beverage, one prepares a series of micropellets by varying the specific gravities of the batches of pellets and determines which batch of coated micropellet will be suspended in the beverage. That is, the specific gravity of the micropellet to be used will be that which neither floats on top of the beverage or sinks to the bottom of the beverage. That would be the ideal micropellet to employ in the beverage.

Batches of micropellets of varying specific gravities could be manufactured and kept in supply. Once the beverage is made, its specific gravity is determined and micropellets from the manufactured batch of the same specific gravity as the beverage can be used.

The micropellets of the desired specific gravity can be made by more severely or less severely compacting the micropellet carrier containing the quinine or quinine salt. In addition, the weight of the coating on the micropellet is to be taken into consideration in making the specific gravity determination. For example, if it is found that a manufactured micropellet sinks in the beverage, the micropellet would have to be made with more air in the interstices of the carrier so that the final micropellet product would have the same specific gravity as the beverage.

Examples of the carriers for the quinine or quinine salt in the micropellets are, for example, long chain glyceryl fatty acid esters, sucrose long chain carboxylic acid esters which are well known in the art. Sugars, such as sucrose or lactose, could be used as the carrier, as well as inert salts, such as calcium phosphate, as well as other carriers well known in the art. The coating on the micropellet can be an enteric coating such as cellulose acetate phthalate, hydroxypropylmethylcellulose phthalate, etc.; products which are commercially available. The particle size of the micropellets could be from 0.5 microns to 100 microns in size, with 10 microns being the optimum size. Of course, the size could vary with the specific optimum size being readily determinable by workers skilled in the art.

The beverage or sports drink of this invention, depending on the physiological circumstances of the user, can have part or all of the carbohydrate replaced with an artificial sweetener such as, for example, Aspartame™ or saccharine. This feature is important for people with diabetes.

The beverage or sports drink of this invention, rather than being supplied as a liquid, can be supplied as a powder in a packet to be dissolved in water; and in addition can be home-carbonated. The dry composition can be formulated as a powder, granules or tablets to be dissolved in water, either carbonated or non-carbonated. An embodiment of this invention envisions enclosing dry ingredients of electrolytes, carbohydrates, flavors, quinine, etc. in a packet which can be added to water or carbonated water.

Carbonation is a desirable feature of the beverage of this invention because it enhances palatability. The product can be carbonated using conventional commercially available cartridges or mixing with carbonated $H_2O$. The carbonation can be in the range of 1 to 5 volumes of carbon dioxide with 3 volumes being preferred. However, the beverage does not have to be carbonated.

Various preservatives, such as salts of sorbic acid or benzoic acid, can be used to stabilize the beverage composition during storage. For purposes of preservation, pasteurization or preparation of the beverage with sterile techniques can be employed.

In the formulations a sufficient quantity of water is added to bring the formulations up to 100%.

EXAMPLES

An embodiment of the sports drink includes the following ingredients and effective amounts:

Glucose: 3–7%

Fructose: 3–7% (Total glucose plus fructose: 6–14%)

Sodium chloride 0.06–0.2%

Potassium chloride: 0.03–0.04%

Citric acid: 0.13–2.5% (sufficient to obtain a pH of 2.5–4.5)

Sodium or potassium monophosphate: 0.01–0.4%

Fruit flavor 0.04–1.0%

Sodium or potassium benzoate: 0.025–0.05 ppm

Quinine hydrochloride dihydrate: <83 ppm (calculated as quinine 20 mg/8 oz)

Sodium citrate: 0.01–0.4%

Carbon dioxide: 1–5 volumes (FDA requires all quinine drinks to be carbonated)

Water to make 100%

The inventor has carried out extensive tests to perfect a beverage which is palatable and pleasant to drink. This has presented a problem because of the bitter taste of the quinine. After much experiment, applicant has found that by lowering the pH of the drink, palatability was improved. The inventor found that at a pH of around 2.5 with the preferred amount of carbohydrate, the quinine beverage was the most palatable.

A preferred formulation with effective amounts is:

Glucose: 4.5%

Fructose: 5.5% (Total glucose plus fructose: 10%)

Sodium chloride 0.09%

Potassium chloride: 0.03%

Citric acid: 0.6% (sufficient to obtain a pH of 2.5)

Sodium monophosphate: 0.02%

Fruit flavor 1% (Lemon-Lime)

Sodium benzoate: 0.05 ppm

Quinine hydrochloride dihydrate: <83 ppm (calculated as quinine 20 mg/8 oz)

Sodium citrate: 0.04%

Carbon dioxide: 1 volume (FDA requires all quinine drinks to be carbonated)

Water to make 100%

Another preferred formulation with effective amounts is:

High fructose corn syrup 10%

Sodium chloride 0.09%

Potassium chloride: 0.03%

Citric Acid: 0.6% (sufficient to obtain a pH of 2.5)

Sodium monophosphate: 0.02%

Fruit flavor: 1% (Lemon-Lime)

Sodium benzoate: 0.05 ppm

Quinine hydrochloride dihydrate: <83 ppm (calculated as quinine 20 mg/8 oz)

Sodium citrate: 0.04%

Carbon dioxide: 1 volume (FDA requires all quinine drinks to be carbonated)

Water to make 100%

A typical formulation of high fructose corn syrup has 55% fructose, 41% dextrose and 4% higher saccharides.

In the above formulations, the quinine or quinine salt could be included in micropellets. The formulation could include part of the quinine or quinine salt in the micropellet and part uncoated to supply a quinine tang.

The sports drink of this invention can comprise effective amounts of carbohydrate, electrolytes and quinine or quinine salts. In addition, the drink is provided with an acid to produce an acid pH for the composition and can also be carbonated. The beverage of this invention is to be employed in a method for preventing cramping resulting from strenuous bodily activity by drinking a beverage comprising carbohydrates, electrolytes and quinine prior to, during or after said strenuous bodily activity, thus preventing cramps. Illustrations of effective amounts of the ingredients of the beverage are those characterized by the examples.

Many advantages are envisioned by this invention.

The drink composition of this invention will provide electrolytes, sugar, fluids and quinine in a single beverage.

The composition will be beneficial in preventing cramps which are a common result of physical exercise.

Marketed in the United States, the drink will be in compliance with all Food and Drug Administration regulations.

The composition of this invention will be palatable and pleasant to drink.

Physical endurance will be enhanced by the drink.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A beverage drink comprising in effective amounts carbohydrate, electrolytes, fluids and quinine or a quinine salt to prevent dehydration, supply energy, and prevent cramps.

2. The beverage drink composition of claim 1 further comprising an acid to produce an acid pH for the composition.

3. The beverage drink composition of claim 1 wherein the quinine salt is quinine hydrochloride dihydrate.

4. The beverage drink composition of claim 1 further characterized as being carbonated.

5. The beverage drink of claim 1 wherein the beverage drink has quinine or a quinine salt disposed in digestible micropellets having the same specific gravity as the beverage drink.

6. The beverage drink of claim 5 wherein a minor amount of quinine is left uncoated in the beverage drink to supply a quinine tang.

7. The beverage drink of claim 1 wherein the beverage drink has an effective amount of glutamyl-gluatamate acid present to improve the palatability of the quinine.

8. The beverage drink comprising the following ingredients and ranges:

Glucose: 3–7%

Fructose: 3–7% (Total glucose plus fructose: 6–14%)

Sodium chloride 0.06–0.2%

Potassium chloride: 0.03–0.04%

Citric acid: 0.13–2.5% (sufficient to obtain a pH of 2.5–4.5)

Sodium or potassium monophosphate: 0.01–0.4%

Fruit flavor 0.04–1.0%

Sodium or potassium benzoate: 0.025–0.05 ppm

Quinine hydrochloride dihydrate: <83 ppm (calculated as quinine 20 mg/8 oz)

Sodium citrate: 0.01–0.4%

Carbon dioxide: 1–5 volumes

Water to make 100%.

9. The beverage drink of claim 8 comprising:

Glucose: 4.5%

Fructose: 5.5% (Total glucose plus fructose: 10%)

Sodium chloride 0.09%

Potassium chloride: 0.03%

Citric acid: 0.6% (sufficient to obtain a pH of 2.5)

Sodium monophosphate: 0.02%

Fruit flavor 1% (Lemon-Lime)

Sodium benzoate: 0.05 ppm

Quinine hydrochloride dihydrate: <83 ppm (calculated as quinine 20 mg/8 oz)

Sodium citrate: 0.04%

Carbon dioxide: 1 volume

Water to make 100%.

10. A beverage drink comprising:

High fructose corn syrup 10%

Sodium chloride 0.09%

Potassium chloride: 0.03%

Citric Acid: 0.6% (sufficient to obtain a pH of 2.5)

Sodium monophosphate: 0.02%

Fruit flavor: 1% (Lemon-Lime)

Sodium benzoate: 0.05 ppm

Quinine hydrochloride dihydrate: <83 ppm (calculated as quinine 20 mg/8 oz)

Sodium citrate: 0.04%

Carbon dioxide: 1 volume

Water to make 100%.

11. A method for preventing cramping resulting from strenuous bodily activity comprising drinking a beverage comprising effective amounts of carbohydrates, electrolytes, fluids and quinine or quinine salt prior to, during or after said strenuous bodily activity, thus preventing cramps.

12. The method of claim 11 wherein the beverage contains the following ingredients and proportions:

Glucose: 3–7%

Fructose: 3–7% (Total glucose plus fructose: 6–14%)

Sodium chloride 0.06–0.2%

Potassium chloride: 0.03–0.04%

Citric acid: 0.13–2.5% (sufficient to obtain a pH of 2.5–4.5)

Sodium or potassium monophosphate: 0.01–0.4%

Fruit flavor 0.04–1.0%

Potassium benzoate: 0.025–0.05 ppm

Quinine hydrochloride dihydrate: <83 ppm (calculated as quinine 20 mg/8 oz)

Sodium citrate: 0.01–0.4%

Carbon dioxide: 1–5 volumes

Water to make 100%.

13. The method of claim 12 wherein the beverage contains the following ingredients and proportions:

Glucose: 4.5%

Fructose: 5.5% (Total glucose plus fructose: 10%)

Sodium chloride 0.09%

Potassium chloride: 0.03%

Citric acid: 0.6% (sufficient to obtain a pH of 2.5)

Sodium monophosphate: 0.02%

Fruit flavor 1% (Lemon-Lime)

Sodium benzoate: 0.05 ppm

Quinine hydrochloride dihydrate: <83 ppm (calculated as quinine 20 mg/8 oz)

Sodium citrate: 0.04%

Carbon dioxide: 1 volume

Water to make 100%.

* * * * *